United States Patent [19]
Martz

[11] Patent Number: 6,007,092
[45] Date of Patent: Dec. 28, 1999

[54] INFLATABLE BELT WEBBING

[75] Inventor: Josef Martz, Eching, Germany

[73] Assignee: Johann Berger, Alfdorf, Germany

[21] Appl. No.: 09/105,054

[22] Filed: Jun. 26, 1998

[30]  Foreign Application Priority Data

Feb. 4, 1998 [DE] Germany ............................ 198 04 378
May 15, 1998 [DE] Germany ............................ 198 21 996

[51] Int. Cl.⁶ .................................................. B60R 21/18
[52] U.S. Cl. ...................................... 280/733; 280/743.1
[58] Field of Search .................................. 280/733, 743.1

[56]  References Cited

U.S. PATENT DOCUMENTS

| | | | |
|---|---|---|---|
| 4,348,037 | 9/1982 | Law et al. ................................ | 280/733 |
| 5,282,648 | 2/1994 | Peterson ................................... | 280/733 |
| 5,480,181 | 1/1996 | Bark et al. ............................. | 280/730.2 |

FOREIGN PATENT DOCUMENTS

| | | | |
|---|---|---|---|
| 2008048 | 9/1971 | Germany . | |
| 4110289 | 10/1992 | Germany ................................ | 280/733 |
| 4305291 | 9/1993 | Germany ................................ | 280/733 |
| 6-72268 | 3/1994 | Japan ..................................... | 280/733 |
| WO 97/06983 | 2/1997 | WIPO . | |

*Primary Examiner*—Eric Culbreth
*Attorney, Agent, or Firm*—Banner & Witcoff, Ltd.

[57]  ABSTRACT

Proposed is a belt webbing, more particularly for an automatic seat belt inflatable at least in part. The belt webbing includes a tubular fabric (6) applied to at least one flat side (top and/or bottom flat side) defined by side edges, extending longitudinally to the belt webbing which is folded (together) about folding edges oriented parallel to the longitudinal direction of the belt webbing (4) so that the belt webbing is substantially in contact with the corresponding flat side in each case. An outer side (16) faces away from the flat side and does not substantially protrude beyond the side edges (12) of the belt webbing (4). The fabric (6) is releasably connected to the belt webbing (4) in the region juxtaposing the side edges (12).

15 Claims, 4 Drawing Sheets

INFLATABLE BELT WEBBING

TECHNICAL FIELD AND BACKGROUND OF THE INVENTION

The invention relates to a belt webbing, more particularly for an automatic seat belt, inflatable at least in part, comprising a tubular fabric applied to at least one flat side (top and/or bottom side) defined by side edges, extending longitudinally to the belt webbing.

"Webbing" or "belt webbing", "belt" or "seat belt" as termed in the following is always intended to mean substantially the same thing, i.e. always involving materials or semi-finished products for use in the manufacture of seat belts and webbing, this applying in the same way too, to the terms "tube" or "fabric".

One such belt webbing is known from German Patent 20 08 048 in which the belt evident therefrom is configured as a tube comprising a stitched-in burst fold configured in such a way that it bursts due to the tensile forces exerted by the belt in a crash situation and the opening of a valve coupled thereto causes inflation of the tubular belt. As a result of this the belt located as a flattened tube prior to the accident and whose width corresponds to half the circumference of the inflated belt is abruptly inflated. Due to this it represents to advantage, as compared to the simple belt, an impact cushion. However, adequate protection of the vehicle passenger is not satisfactorily assured due to the insignificant extent of the inflated tubular belt. An increase in the circumference of the belt tube with an inflatable cushion arranged in a part of the belt around the belt, likewise stated in the cited document, is also of a disadvantage since the corresponding cushion is not necessarily located at the right position and thus fails to be available for its actual purpose.

Known from the international patent application PCT/US 95/10695 is an inflatable tubular restraint system. The seat belt system shown in this case consists of a lap belt and a shoulder belt, the lap belt consisting regionally of an inflatable balloon, the length of which is shortened during inflation thus having in addition to the cushioning function also a belt tensioning function. In this arrangement, however, although that midriff zone of the passenger is particularly protected, the shoulder and head zone—except for an additional restraint of the shoulders due to the tensioned belt—fails to be taken into account.

SUMMARY OF THE INVENTION

It is thus the object of the invention to define a belt or belt webbing which ensures optimum impact protection in a crash situation more or less without any restriction, i.e. possibly also independent of any location.

This object is achieved by a belt webbing, more particularly for an at least partly inflatable seat belt, comprising a tubular fabric applied to at least one flat side (top and/or bottom flat side) elongated relative to the belt webbing, wherein the fabric is folded (together) about folding edges oriented parallel to the longitudinal direction of the belt webbing so that the fabric is substantially in contact with the corresponding flat side, that it features an outer side facing away from the flat side and that it does not substantially protrude beyond the side edges of the belt webbing, the fabric being releasably connected to the belt webbing in the region juxtaposing the side edges.

The tubular fabric applied to the flat side is selectable with a tube diameter as desired in each case as best suited to sufficiently cushion the pelvis, hips, chest, shoulders and head. The inflatable fabric which is folded in the resting position is deployed in a problem situation by being abruptly inflated e.g. by conventional inflator means to its maximum tube size which may approach the volume of an air bag as known to the person skilled in the art, thus offering optimum passenger protection.

In one advantage aspect of the invention the first belt webbing is supplemented by a second belt webbing, the folded tubular fabric being sandwiches between the two belt webbings so that the first belt webbing is more simply configured in its structure and strength and has the same configuration as the second belt webbing, thus enabling the rupture load capacity of both belt webbings together to correspond to the rupture load capacity of a conventional belt webbing. In the regions juxtaposing the side edges the two belt webbings can be connected to each other by means of a burst seam designed to burst in a problem situation and permit deployment of the tubular fabric. Instead of burst seams other means of connecting the fabric plies located fan-folded on each other can be selected, e.g. bond tacking or welding. This configuration is especially of advantage since it features a hard-wearing material on all outer sides of the belt webbing. This example embodiment may be improved even further by the second belt webbing being represented by regional reinforcement of the outer side of the fabric so that the fabric in this region features the rupture loading capacity of the second belt webbing (see above), this applying also to the first belt webbing in yet a further advantagous embodiment. The advantages consist mainly in a one-part integral embodiment of the belt webbing. To enhance the user friendliness of the belt webbing an edging of a soft material may be applied to the side edges of the first and/or second belt webbing to reduce passenger clothing wear and tear.

The belt webbing is favorably configured as a woven tubular belt webbing produced endless and having two woven plies, in which the total rupture capacity of selected warp threads corresponds to the total rupture capacity of the warp threads of a conventionally woven belt webbing. Producing a belt webbing in the webbing weaving loom permits exceptionally cost-effective endless production of the belt webbing in accordance with the invention and thus also no problem in cutting to length for each particular application. In further advantagous aspects of the invention the warp threads selected to take the necessary total rupture load of the belt webbing may be arranged in a middle region of the woven plies of the belt webbing if the fabric sections to be folded are intended to be e.g. thinner, i.e. incorporate thinner warp threads or if should this not be desired, a woven tubular belt webbing may comprise, in a further alternative, warp threads evenly distributed over the full weaving width, handling the total rupture load. The woven tubular belt webbing may be preferably further configurable by loops in the form of a fluted edge or the like being woven to the edges of the flat side resulting in a soft belt webbing edge and reduced user clothing wear and tear.

A further advantageous embodiment of the invention consists of a woven belt webbing tube having at least three woven plies, the middle woven ply being divided parallel to the warp threads after weaving, thus resulting in the advantage that after weaving and dividing the middle woven ply a tubular fabric is immediately provided without any actual folding being necessary. This saves production time and machinery to a great extent and thus decisively reduces the costs of production.

Due to the fact that the belt webbing in accordance with the invention contains substantially more material than a conventional belt webbing there is a possibility of a space problem materializing in it passing through the buckle tongue or retractor mechanism. An immediate solution to this problem as regards the buckle tongue is achieved by widening the passage slot of the buckle tongue. However, to avoid any increase in size of the retractor mechanism in conjunction with belt webbing in accordance with the invention it can be configured as a conventional webbing as of the point at which the coiled webbing comes to rest just before the retractor mechanism.

Further advantageous features read from the sub-claims.

BRIEF DESCRIPTION OF THE DRAWINGS

Example embodiments of the invention will now be described in further explaining the invention and in illustrating how it is configured with respect to the drawings in which.

DETAILED DESCRIPTION

Figure 1:
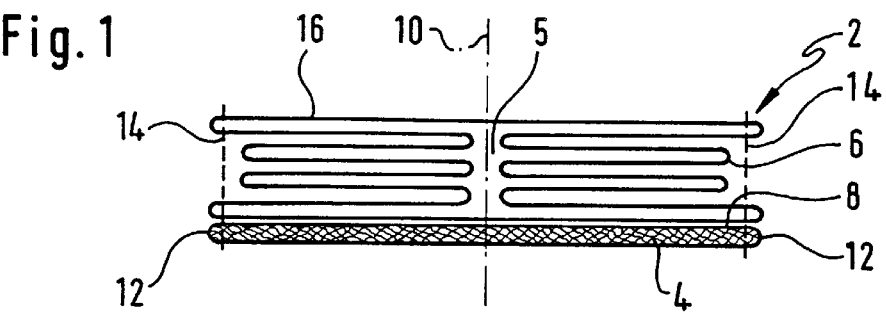
FIG. 1 is a greatly simplified schematic illustration in cross-section of one example embodiment of a belt webbing in accordance with the invention.

Referring now to FIG. 1 there is illustrated in cross-section a belt webbing 2 in accordance with the invention incorporating a belt webbing 4 to which a fan-folded tubular fabric 6 is applied. The arrangement of the belt webbing 2 symmetrical relative to the axis 10 is evident from all FIGS. of this description. However, this is not to be interpreted necessarily that the belt webbing in accordance with the invention needs to be folded in a symmetrical arrangement, i.e. one or the other non-symmetrical type of fold possibly being expedient, depending on the specifically desired final shape of the tubular belt in its inflated condition. As is evident from FIG. 1 the fabric 6 is applied to one flat side 8 of the belt webbing 4 running over the full belt webbing width, before then reversing level with the side edges 12 through 180° in the opposite direction and is guided up to roughly the middle of the belt webbing where it is again folded through 180° outwardly. In the turn of the fabric 6 oriented again outwardly in the direction of the side edge 12 it is evident that the next folding edge comes to rest slightly further inwards in the direction of the axis 10 since the folding edge needs to be located within the burst threads 14 connecting the outer layers depicted by the broken line. This fanfolding of the fabric 6 is continued up to the topmost outer side 16 facing away from the flat side 8 of the belt webbing 4 of the tubular fabric 6, the outer folding edges of which are located the same distance away from the axis 10 as the side edges 12 of the belt webbing 4. Evident from FIG. 1 roughly in the region of the axis 10 is an inner space 5 of the belt webbing which as illustrated in this case has been selected particularly narrow. It will be appreciated, however, that this can be handled differingly depending on the designer requirements. As illustrated later, for example in FIG. 5, this inner space 5 may be configured widened to one side or to both sides, reference again being made to the possibility of locating the folds of the fabric non-symmetrical as already mentioned above.

Figure 2:
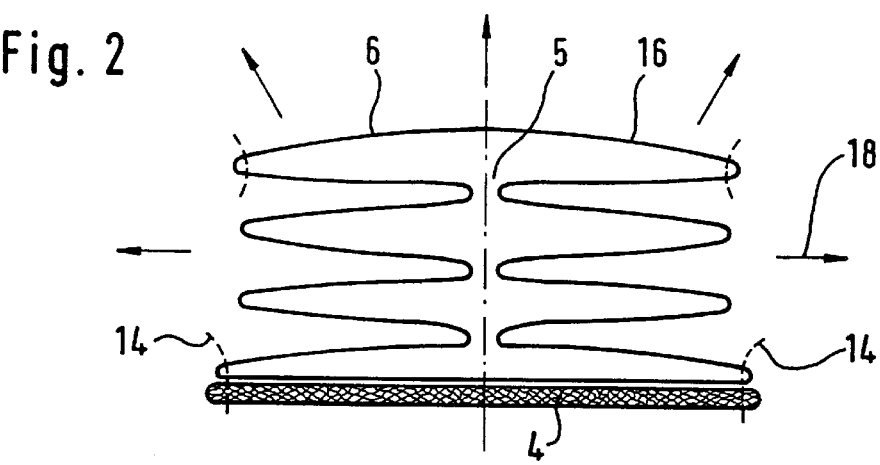
FIG. 2 is a view of the belt webbing as shown in FIG. 1 but shortly after bursting of the burst seams on commencement of the inflation phase.

Referring now to FIG. 2 there is illustrated the belt webbing as shown in FIG. 1 just before the expansion gas is injected into the inner space of the fabric 6. The directions in which the fabric 6 moves and expands can be visualized in theory from the star cluster arrays of the arrows 18, it being evident the remainders of the burst threads 14 are loosely located in the region of the side edges of the outer side 16 and the side edges 12.

Figure 3:
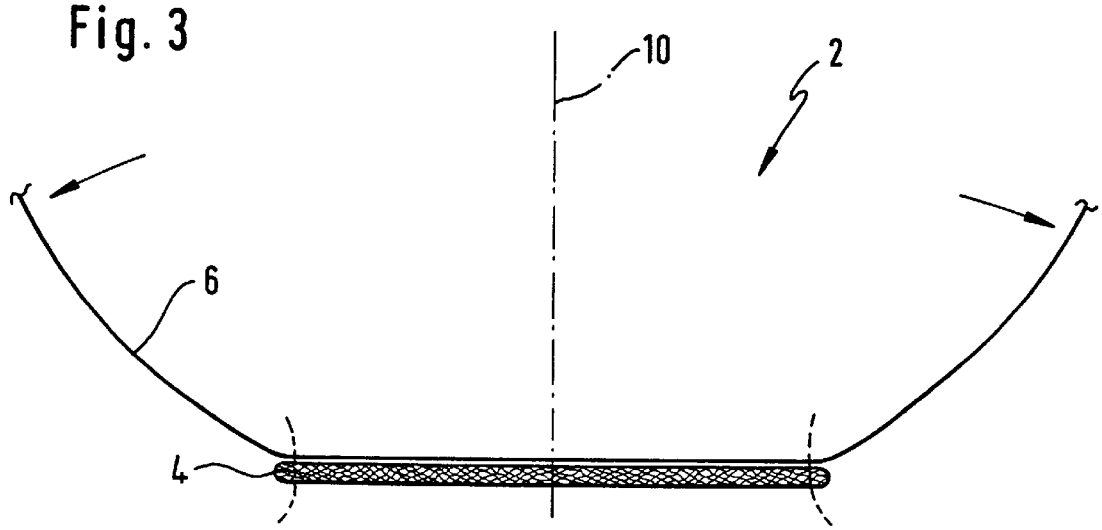
FIG. 3 is a view of the belt webbing as shown in FIGS. 1 and 2, illustrated partly in the fully inflated condition.

FIG. 3 illustrates the webbing as shown in FIGS. 1 and 2, in this case in the inflated form represented by the broken line.

Figure 4:
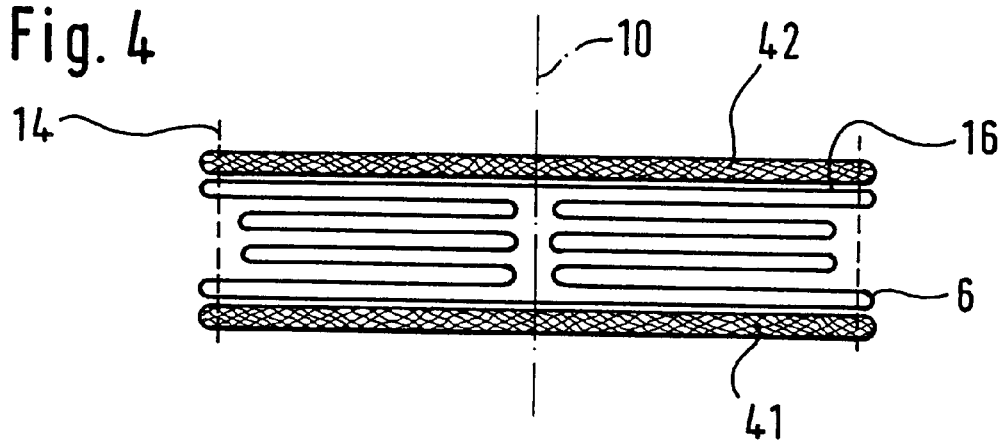
FIG. 4 illustrates a further example embodiment of the invention showing upper and lower belt.

The belt webbing as shown in FIG. 4 contains a first belt webbing 41, as evident from FIG. 1, and a second belt webbing 42 assigned to the outer side 16 of the tubular fabric 6 already shown in FIG. 1. This embodiment permits dividing the rupture load of the belt webbing identified as 4 in FIG. 1 to the belt webbings 41 (first belt webbing) and 42 (second belt webbing) or upper belt 41 and lower belt 42 as illustrated in this case. The advantage of this embodiment is a tougher configuration of the outer side of the tubular fabric 5. In addition, a certain redundancy of the two belt webbings, first belt webbing 41 and second belt webbing 42 exists, adding additionally to enhance the function reliability of the belt webbing.

Figure 5:
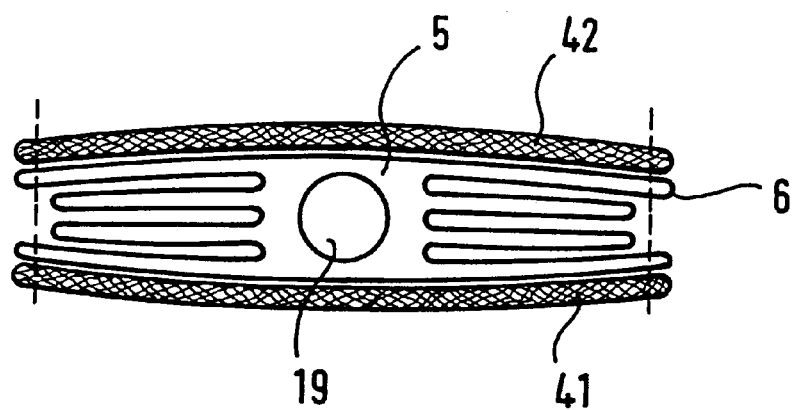
FIG. 5 illustrates an embodiment similar to that as shown in FIG. 4 in the middle region of the belt webbing of which, however, space for a gas supply conduit is maintained free.

Referring now to FIG. 5 there is illustrated a variant of a belt webbing in accordance with the invention having an expanded inner space 5 to make room for a gas supply conduit 18.

Figure 6:
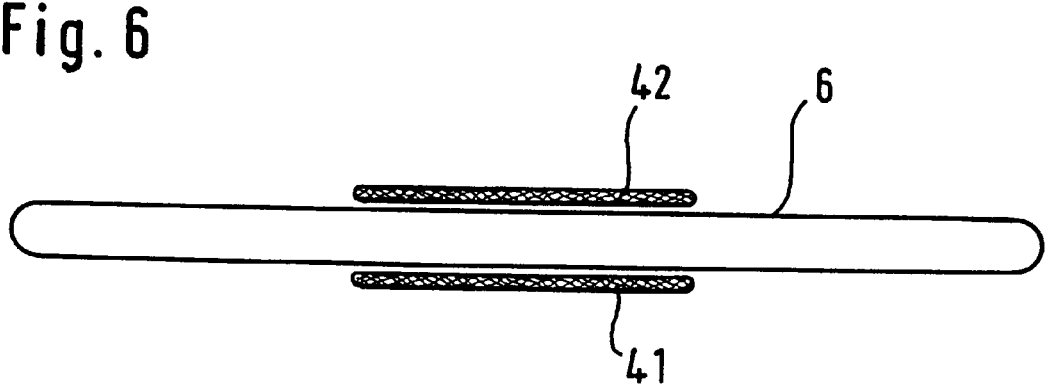
FIG. 6 is a schematic view of an example embodiment similar in shape to that as shown in FIG. 4, but in half the scale of magnitude hitherto, and in the folded but not inflated condition.
Figure 7:
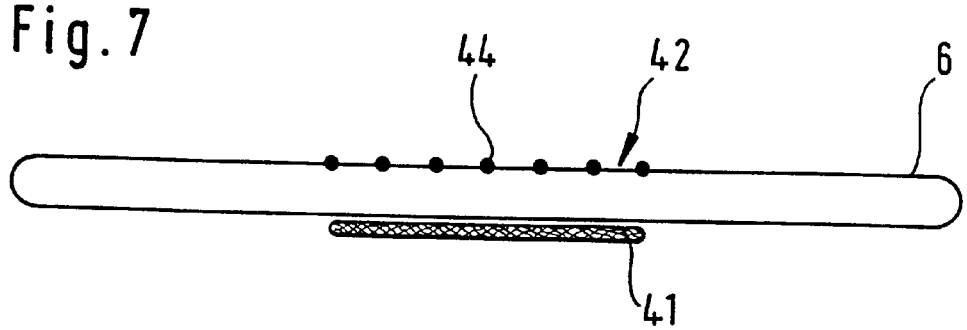
FIG. 7 illustrates a further embodiment of a belt webbing in accordance with the invention analogous to that as shown in FIG. 6.
Figure 8:
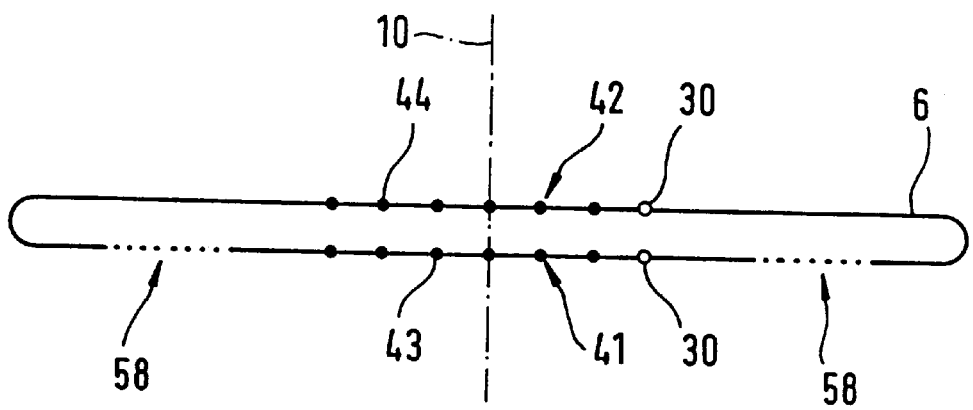
FIG. 8 again illustrates a further example embodiment of a belt webbing analogous to that as shown in FIG. 6 but indicating a special edge configuration.

FIGS. 6 to 8 schematically illustrate embodiments of the belt webbing in accordance with the invention on half the magnified scale of that as compared to FIGS. 1 to 5 in the unfolded, slack condition. For orientation the embodiment as shown in FIG. 4 is illustrated accordingly once again in FIG. 6. Evident are the belt webbings 41 and 42 sandwiching between them the tubular fabric 6. It will of course be appreciated that the burst seams 14 as shown in FIG. 1 or FIG. 4 are to be additionally visualized, they having been omitted to simplify the illustration, although they would still be necessary in this embodiment (as compared to a few of the following examples). It is in this context that it should also be noticed that the burst thread 14 may also be replaced by other connecting means such as bonding or welding the edge regions of the tubular fabric or belts 41, 42 or by some other releasable type of connection, e.g. loop stitching.

Referring now to FIG. 7 there is illustrated the second belt webbing 42 replaced by specific warp threads 44 intended to handle the longitudinal tensioning force of the webbing 42. Here, of course, only a few warp threads 44 are shown as an example for a substantially higher number of warp threads actually employed in this case. The advantage of this configuration is the actual total elimination of the belt webbing 42 shown in earlier example embodiments and thus also of the connection needed in each case. The example embodiment as shown in FIG. 7 corresponds more or less completely to the example embodiment as shown in FIG. 1, the main difference being, however, that in FIG. 7 the longitudinal tensioning forces of the belt webbing are handled by both "belt webbing 41" and "belt webbing 42" via the warp threads 44 thereof, unlike the situation relative to example embodiment 1 where the belt webbing 4 handles all longitudinal forces.

Referring now to FIG. 8 there is illustrated a further embodiment of a belt webbing in accordance with the invention, whereby here too, the lower belt 41 has been replaced by warp threads 43 analogous to the warp threads 44 as shown in FIG. 4. This embodiment permits a configuration of a tubular fabric 6 with integrated belt webbings 41 and 42 represented in lieu by warp threads 43 and 44 assigned accordingly. This results to advantage in an even more favorable method of producing a belt webbing in accordance with the invention as a tubular fabric having precisely defined warp thread qualities. Just as conceivable and belonging to the invention is a configuration of a belt webbing in accordance with FIG. 8 in which the warp threads 43 and 44 are, however, not concentrated in the middle region, as shown in FIG. 3, but may be distributed over the full woven width of the tubular fabric 6. This results in a somewhat more rigid tubular belt which distributes the tensile forces of the belt webbing over the full cross-section. Depending on the individual requirements of the seat belt manufacturer either the one or the other variant is given preference.

Figure 9:
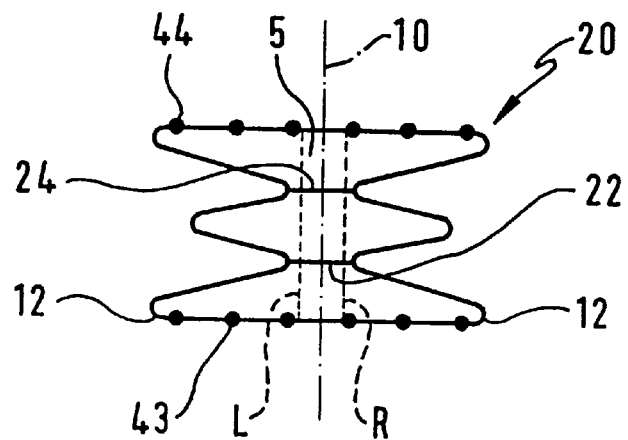
FIG. 9 illustrates yet a further example embodiment of the invention in the form of a multi-ply woven belt webbing tube.

In conclusion FIG. 9 illustrates a multi-ply woven belt webbing 20. Evident in the outer regions remote from the center line 10 is a six-ply type of weave, whilst in the middle region only four plies are woven. Clearly evident is the position of the outer sandwich arrangement of six woven plies already arranged fan-folded. It is just as the belt webbing 20 is depicted that it leaves the webbing loom, i.e. to arrive at the belt webbing in accordance with the invention the inner plies 22 and 24 are divided in the region between the lines L and R depicted broken, more particularly along the center line 10 so that a full-length inner space 5 materializes. The belt webbing 20 as shown in FIG. 9 is represented drawn apart upwards and downwards, whereas in reality the plies are located directly on each other so that the belt webbing needs to be slightly spread (similar to that as shown) to part the plies 22 and 24. Then, when the outer sides are further joined to each other in the region of the side edges 12, the belt webbing in accordance with the invention is already completed.

The belt webbing in accordance with the invention can be put to use to particular advantage in vehicular rear seat belts, namely there, where no suitable local features exist for incorporating e.g. an air bag of a conventional kind. This is why the belt webbing is also suitable for seat belts in buses or also aircraft and hydrofoil craft, indeed in all applications in which passenger seats are arranged one behind the other. As already mentioned, the one or other embodiment is formulated in keeping with the special requirements of the designer. It will readily be appreciated that an embodiment as shown in FIGS. 1 to 3 is selected when a more cylindrical body of the impact cushion formed by the belt webbing 4 and fabric 6 is desired. A flatter configuration of an impact cushion materializes from using the belt webbings in accordance with, the example embodiments as shown in FIGS. 4 to 9. Indicated on the right-hand side of FIG. 8 is an additional row of stitches 30 evident on each of the side edges 12 of the belt webbing 4. The object of this embodiment is a softer configuration of the belt webbing edge to greatly reduce passenger clothing wear and tear. On the other hand, it is in this case that selecting the warp threads 43 and 44 in the region of the arrangement of the specific warp threads 43 and 44 as shown, results in the belt webbing produced as an one-part integral tubular fabric 6 being particularly resistant to abrasion. For a soft edge according to a stitching 30 (FIG. 8) the fluted edge as known to the person skilled in the art is particularly expedient.

Likewise included in the scope of the present invention is an embodiment of a belt webbing as claimed achieved by extruding plastics material, e.g. in the form of that as shown in FIG. 8, whereby here too, "warp threads" 43 and 44 may be embedded as a longitudinal reinforcement of the extruded endless webbing. It is to be noted in this respect that fabric termed as such must not necessarily mean that the corresponding material is woven, it indicating instead quite generally textile or textile-type reel ware material.

A belt webbing in accordance with the invention has the enormous advantage that as a rule it can replace conventional belts with no problem. Where in the region of the automatic retractor mechanism a conventional webbing is to be fitted to a webbing in accordance with the invention the one and only change needed to existing seat belt systems is to slightly widen the webbing slot in the buckle tongue so that the slightly more bulky webbing in accordance with the invention can pass through with no problem, whereby, of course, the buckle tongue needs to be further widened should a more extensive gunning gas supply be needed, for instance, due to having retrofitted an integrated tubing.

Engineering seat belt systems with the webbing in accordance with the invention permits cushioning of the passanger in all regions in which the belt is present at all. Accordingly, it is actually a single replacement for several air bags of the conventional kind, namely as the belt webbing in accordance with the invention, thus eliminating the need for a bag for the lap, midriff, chest, collar bone and shoulder regions as well as the so-called headside bag.

To maintain the function of the inflated belt webbing as long as possible it is of great advantage to coat the belt webbing in accordance with the invention on the inside, for example, with silicone or polyurethane. Coating the tubular fabric may also be achieved by impregnation and/or dyeing when dyes on a special synthetic basis compound correspondingly with the fabric so that it becomes impermeable.

As already mentioned above, inflating the belt webbing in accordance with the invention to an hitherto unattainable, extremely large diameter acts simultaneously as a belt tensioner. Trials have indicated in all that using the belt webbing in accordance with the invention greatly reduces the risk of specific injuries to passengers, since the force of the belt webbing is distributed over the full trunk of the person involved, thus greatly diminishing the concentrated force effects tending to cause injury. By engineering specific air and gas permeability in selected regions of the tubular fabric (6) a controlled so-called "dive" and thus also a reduction in loading is achieved to advantage by the passenger diving into the belt being better "cushioned" by the controlled slackening of the belt webbing. The work involved in cushioning is better distributed, the extent of injuries reduced. Another advantageous method consists of providing the tubular fabric (6) with gas exit ports 58 (FIG. 8) in selected regions which have a similar effect.

Another aspect in accordance with the invention of the belt webbing as discussed above also consists of weaving a so-called one-piece air belt in which with the aid of a Jaquard loom the complete seat belt is woven from one end to the other in one piece. In this case, the regions such as e.g. the reeling region, the thin webbing and protection region desired in each case in the belt webbing in accordance with the invention can be taken into account individually in keeping with the specific requirements of each vehicle or aircraft manufacturer, as a result of which—as already mentioned above—the effects of conventional side and front air bags are assumed by a single safety system. This makes for high savings in production costs whilst decisively enhancing the safety due to the compact combined solution to the problem. It will, of course, be appreciated that all features of a one-piece air belt can be adapted to differing passenger stature and weight requirements, thus accommodating production of a child's air belt just as well as for heavy adults in taking into account any specially desired position and arrangement of permeable regions of the air belt fabric as well as the desired length of the air belt in each case.

Yet a further advantageous aspect of the invention consists of scoring the tubular structure of the webbing, tubing or fabric to facilitate folding more particularly in fabricating the belt webbing ready for installation, this scoring being done in selected regions along lines running parallel to the longitudinal axis of the tubing. Fabrication is then able to be completed much quicker since the belt webbing tends to fold "by itself" This resulting in a substantial time saving in final assembly, whereby but slight scoring is sufficient.

For producing such a webbing, tubing or fabric it is proposed in accordance with the invention to guide the tubular structure along the lines over hot ironing edges, this being expediently done directly after production of the webbing, tube or fabric material, i.e. in a condition in which the material is still to be applicated and is therfore still relatively easy to handle.

Another variant which is just as advantageous consists of folding the tubular structure along the lines prior to it being hot ironed. This can be done with an iron by conventionally known methods. In both methods as mentioned the material is lightly fused on being scored and is thus unable to fully return from the fold, thus resulting in an effect expedient to folding.

When a woven material is made use of as the fabric, webbing or tube material it is of advantage to "incorporate" in the selected regions along the planned "ironing lines" warp threads separately engineered for this purpose, i.e. the warp thread material itself being selected accordingly as to its strength, capillary number and/or composition. The type of weave selected in the region concerned may also be decisive.

In still another advantageous aspect of the invention the webbing, tubing or fabric is characterized by the tubular structure being coated on the inside at least regionally, serving to regulate the permeability of the fabric, it being easier for the inflation gas of the air belt to exit from non-costed zones of the fabric than from the coated zones. Also of particular importance in this respect is the location of the non-coated regions since the, as a rule, hot inflation gas of the air belt needs to escape and exit from a region facing away from the body of the passenger to avoid injury by the hot gas, whereby even in the case of cold inflation gases there is a risk of injury due to their shock flow velocity.

Figure 10:
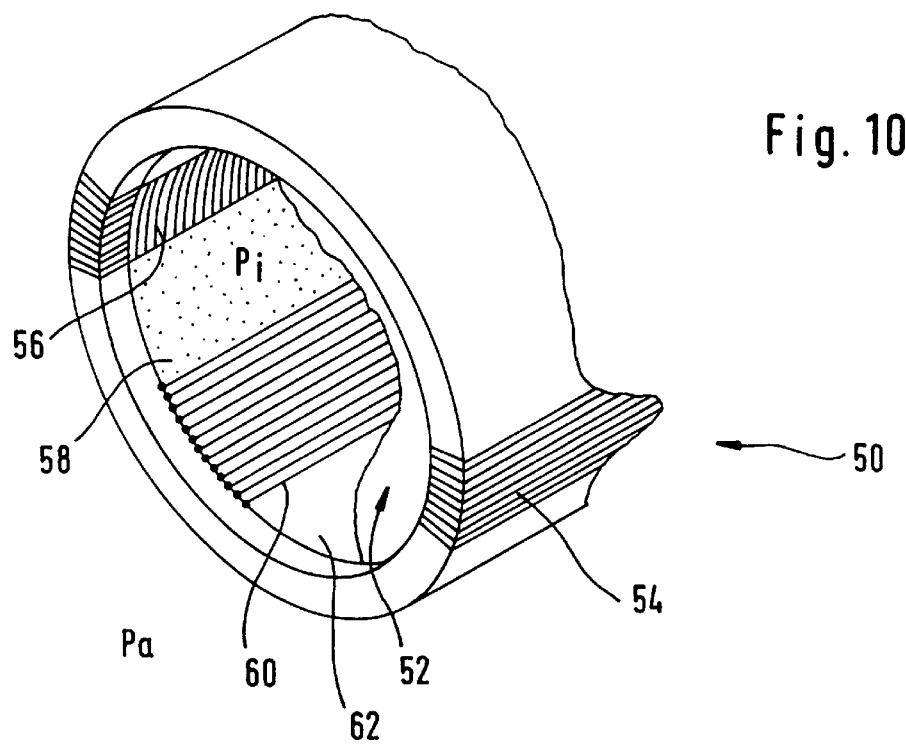
FIG. 10 is a schematic partial perspective view of a tubular structure in accordance with the invention.

For this purpose also an advantageous method of producing a coated webbing, tubing or fabric 62 in accordance with the invention is proposed which is characterized in that the tubular structure 50 (FIG. 10) is provided as a substantially tubular chamber 52, the inner contour of which roughly corresponds to the outer contour of the non-folded or unfolded structure 62, whereby the chamber comprises a wall 54 permeable to gas at least in part and in that a gas entraining the coating means 56 at a pressure $P_i$ is introduced into the structure whilst outside of the chamber a pressure $P_a$ exists so that $P_i > P_a$. The procedure is thus actually already described so that a person skilled in the art can implement the method, by means of which the local permeability of the structure can be controlled very simply. The coating means 56 introduced as a rule with a solution then deposits only in the region within the structure on the inner wall thereof, opposite to which a gas-permeable wall of the chamber is located. It is at this location (these locations) that the gas escapes from the chamber it, in doing so, "sweeping" the coating means (e.g. a polythene compound) from the fabric, whereas in the region of non-permeable zones of the chamber wall no, or hardly any, coating of the coating means takes place on the structure. These regions are the permeable zones 58 (FIG. 8) (see above) in the finished condition of the air belt due to the "missing" coating. It will be appreciated that this method can only be put to use in conjunction with gas-permeable fabrics, it again being emphasized in this context that the term "fabric" is to be understood quite generally so that it also includes non-wovens, i.e. also e.g. knitted or Raschel-knit goods.

Figure 11:
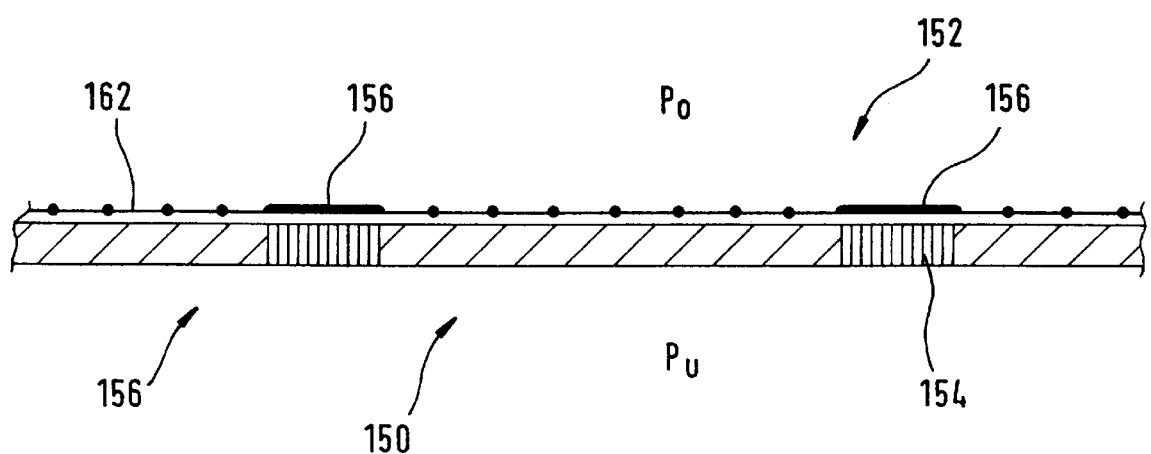
FIG. 11 is a schematic cross-sectional view of a flattened out gas permeable wall of a "slitted" chamber embodiment of the invention.

In the previous paragraph the coating of a tubular structure was described. However, it is just as conceivable to "slit" the tubular structure and to arrange it flattened out of the inner surface of the gas-permeable wall of a likewise "slitted" chamber 52, the localities "inner" and "outer" then becoming e.g. "upper" and "lower". Analogous to the inner space of the aforementioned structure a gas entraining a coating means 56 at a pressure $P_o$ is then applied to the flattened out surface, whilst a pressure $P_u$ exists on the outer side of the wall (i.e. underneath) outside of the chamber, whereby $P_o > P_u$. The further procedure in producing the coating 56 (FIG. 11) is then analogous to that already described for the tubular fabric 62.

As already mentioned elsewhere the "fabric" may be genuinely a woven fabric, although other advantageous makes are just as possible: the fabric may be expediently formed as a flexible plastics material, e.g. silicone, more particularly extruded. The advantages in this respect lie more particularly in the material properties, namely very high resistance to heat (hot injection gases being employed in part for the seat belt) coupled with high elasticity.

One advantageous aspect of this embodiment consists of sheathing the silicone tubing in a "corset stocking" which may consist of a netted or knitted or Raschel-knit fabric. Its embodiment as a knitted or Raschel-knit stocking has the advantage that the radial stretch of the knit can be engineered whilst contracting longitudinally, thus resulting in an advantageous additional tautening effect when the seat belt is activated. In addition, this procedure obviates the aforementioned folding procedure of the tubing, resulting in cost savings.

What is claimed is:

1. A woven multi-ply inflatable belt webbing for a seat belt, wherein
   a) said belt webbing is woven as a tubular belt webbing having an upper woven ply and a lower woven ply, each said ply having a middle region having first warp threads, and two adjoining fabric sections adjoining said middle region,
   b) said first warp threads in said middle regions of said two woven plies providing a primary rupture strength of said webbing to withstand tensioning forces imparted to said belt webbing,
   c) said adjoining fabric sections having second warp threads being thinner than said first warp threads of said middle regions,
   d) said adjoining fabric sections having outer folding edges oriented parallel to the longitudinal direction of said belt webbing, and being folded about said outer folding edges so that said fabric sections come to rest in each case between said middle regions of said upper and lower woven plies, and
   e) said middle regions of said upper woven ply and of said lower woven ply are releasably joined to each other in an area adjoining said outer folding edges.

2. The belt webbing as set forth in claim 1, wherein an edging of soft material is applied to side edges of said adjoining fabric sections of at least one of said upper end lower woven plies.

3. The belt webbing as set forth in claim 1, wherein said belt webbing is at least partially coated.

4. The belt webbing as set forth in claim 1, wherein said adjoining fabric sections are fan-folded to form multiple fabric plies between said upper and lower woven plies, said fabric plies being connected by inner folded edges located in the vicinity of a belt centerline such that an inner space is formed between said folded fabric plies situated on either side of said centerline.

5. The belt webbing as set forth in claim 1, wherein said tubular belt webbing comprises, in selected regions, a selected gas-permeability.

6. The belt webbing as set forth in claim 1, wherein said tubular belt webbing comprises gas exit ports in selected regions.

7. The belt webbing as set forth in claim 1, wherein said adjoining fabric sections are scored in selected regions along lines oriented parallel to a centerline of said belt webbing, to simplify fold formation in fabrication.

8. A method of producing a woven multi-ply inflatable belt webbing, comprising:
   a) weaving a tubular belt webbing having an upper woven ply and a lower woven ply, each said ply having a middle region having first warp threads and two adjoining fabric sections adjoining said middle region,
      i) said first warp threads in said middle regions of said two woven plies providing a primary rupture strength of said webbing to withstand tensioning forces imparted to said belt webbing,
      ii) said adjoining fabric sections having second warp threads which are thinner than said first warp threads of said middle regions,
   b) folding said adjoining fabric sections about outer folding edges so that said fabric sections come to rest in each case between said middle regions of said upper and lower woven plies, and
   c) releasably joining said middle regions of said upper woven ply and of said lower woven ply in an area adjoining said outer folding edges.

9. The method of producing a belt webbing as set forth in claim 8, further comprising:
   a) introducing said tubular belt webbing into a structure containing a substantially tubular chamber, an inner contour of which roughly corresponds to an outer contour of said belt webbing when unfolded, said chamber comprising a wall which is gas-permeable at least regionally,
   b) introducing a gas entraining a coating means at a pressure $P_i$ into said structure whilst on an outer side of said wall, outside of said chamber, a pressure $P_a$ exists, whereby $P_i > P_a$.

10. A method of producing a belt webbing as set forth in claim 8, comprising:
    a) applying said belt webbing initially as a slitted flat fabric to a base, said base comprising a gas-permeable wall at least in part,
    b) applying to said fabric a gas entraining a coating means at a pressure $P_o$ whilst on a side of said wall facing away from said belt webbing a pressure $P_u$ exists, whereby $P_o > P_u$ and
    c) applying said flat belt webbing in the form of a tubular fabric.

11. The method as set forth in claim 8, further comprising scoring said adjoining fabric sections in selected regions along lines oriented parallel to a centerline of said belt webbing, and guiding said adjoining fabric sections along said lines over hot ironing edges.

12. The method as set forth in claim 8, further comprising scoring said adjoining fabric sections in selected regions along lines oriented parallel to a centerline of said belt webbing, folding said adjoining fabric sections along said lines and hot ironing.

13. A method of producing a multi-ply inflatable belt webbing, comprising:
    forming a tubular belt webbing having an upper and lower ply, each said ply having a middle region and two sections adjoining said middle region;
    folding said adjoining fabric sections about outer folding edges so that said fabric sections come to rest in each case between said middle regions of said upper and lower plies;
    releasably joining said middle regions of said upper and lower plies in an area adjoining said outer folding edges;
    introducing said tubular belt webbing into a structure containing a substantially tubular chamber, an inner contour of which roughly corresponds to an outer contour of said belt webbing when unfolded, said chamber comprising a wall which is gas-permeable at least regionally; and
    introducing a gas entraining a coating means at a pressure $P_i$ into said structure whilst on an outer side of said wall outside of said chamber a pressure $P_a$ exists, whereby $P_i > P_a$.

14. A method of producing a multi-ply inflatable belt webbing, comprising:
    forming a tubular belt webbing having an upper and lower ply, each said ply having a middle region and two sections adjoining said middle region;
    folding said adjoining fabric sections about outer folding edges so that said fabric sections come to rest in each case between said middle regions of said upper and lower plies;
    releasably joining said middle regions of said upper and lower plies in an area adjoining said outer folding edges;

scoring said adjoining fabric selections in selected regions along lines oriented parallel to a centerline of said belt webbing; and guiding said adjoining fabric sections along said lines over hot ironing edges.

15. A method of producing a multi-ply inflatable belt webbing, comprising:

forming a tubular belt webbing having an upper and lower ply, each said ply having a middle region and two sections adjoining said middle region;

folding said adjoining fabric sections about outer folding edges so that said fabric sections come to rest in each case between said middle regions of said upper and lower plies;

releasably joining said middle regions of said upper and lower plies in an area adjoining said outer folding edges;

scoring said adjoining fabric sections in selected regions along lines oriented parallel to a centerline of said belt webbing; and folding said adjoining fabric sections along said lines and hot ironing.

* * * * *

UNITED STATES PATENT AND TRADEMARK OFFICE
CERTIFICATE OF CORRECTION

PATENT NO.: 6,007,092

DATED: December 28, 1999

INVENTOR(S): Josef MARTZ

It is certified that an error appears in the above-identified patent and that said Letters Patent is hereby corrected as shown below:

In claim 10, column 10, line 21:

Delete "belt webbing" and insert --fabric--.

Signed and Sealed this

Fifth Day of December, 2000

*Attest:*

Q. TODD DICKINSON

*Attesting Officer*    *Director of Patents and Trademarks*